UNITED STATES PATENT OFFICE.

OTTO RUFF, OF BERLIN, AND WILHELM PLATO, OF COLBERG, GERMANY.

PROCESS OF MANUFACTURING CALCIUM.

No. 806,006.          Specification of Letters Patent.          Patented Nov. 28, 1905.

Application filed January 20, 1903. Serial No. 139,821.

*To all whom it may concern:*

Be it known that we, OTTO RUFF, doctor of philosophy, a subject of the German Emperor, residing at 21 Thomasinsstrasse, Berlin, and WILHELM PLATO, chemist, a subject of the King of Prussia, German Emperor, residing at Colberg, Province of Pommern, Kingdom of Prussia, German Empire, have jointly invented new and useful Improvements in Processes of Manufacturing Calcium, of which the following is a specification.

This invention relates to the process of manufacturing calcium metal by means of electrolyzing calcium chlorid, and has for its object to render the process more expeditious and considerably cheaper.

In the accompanying drawings is illustrated an apparatus suitable for carrying out our invention, in which—

Figure 1 is a vertical section of such apparatus, and Fig. 2 is a horizontal plan of the same.

Referring to the drawings in detail, $a$ is a crucible of any suitable form.

$b$ is the electrolyte.

$c$ is a diaphragm placed between the electrodes $d$ and $e$.

We have found that the manufacture of calcium metal by electrolysis may be carried out very expeditiously if one subjects to electrolysis a molten mixture of calcium chlorid and such salts of calcium as are capable of lowering the melting-point of calcium chlorid, the latter being at about 780° Celsius. Such salts of calcium are all salts that will not form with calcium chlorid isomorphous mixtures. We prefer such salts of calcium that are not decomposed by being heated to the melting-point of calcium chlorid or calcium chlorid containing the said salts and will not give basic substances under said conditions. We have found the following salts of calcium as the most suitable for carrying out our process: calcium sulfate, calcium iodid, calcium bromid, calcium fluorid. We prefer to use calcium fluorid, although we have found also the other calcium salts being capable of lowering the melting-point of calcium chlorid to be suitable for our process. By adding calcium fluorid to calcium chlorid we may attain a lowering of the fusion-point of the calcium chlorid by 120° Celsius, according to the amount of calcium fluorid added. By small additions of calcium fluorid we obtain a small lowering, by large additions a larger, the maximum being 120° Celsius. We may also use mixtures of the said salts. For instance, we may electrolyze calcium chlorid containing calcium iodid and calcium fluorid. The said salts of calcium render the molten mixture sufficiently heavy in order to enable the calcium metal obtained in our process to ascend to the surface of the melting mass. It is important to avoid the presence of silicious matters—as silicates, for instance—as in the presence of the said substances calcium silicid may be formed that will prevent the calcium particles to unite themselves and to form coherent globules. It is necessary to carry out the electrolyzing of the molten mass containing calcium chlorid and the other said calcium salts at temperatures above the melting-point of calcium metal—*i. e.*, above 700° Celsius, preferably about 760° Celsius. It has been found that maintaining a temperature above the melting-point of calcium, now found at 780° Celsius, will cause a diminution of the yield of calcium, whereas a lower temperature causes a porous mass of metallic calcium that may be separated from the cathode only with difficulties. By using a temperature nearly to the melting-point we obtain the metallic calcium in a molten state swimming on the surface of the bath. It is, however, suitable not to use too high a temperature, being apt to effect a vaporization of calcium during electrolysis, in order to avoid a combustion and vaporization of the calcium metal obtained. The skilled workman will find the temperature suitable for carrying out our process easily by experiments. It is required to employ a suitable high density of electric current. The density of electric current will be found by experiment. We have found as suitable density 3 to 6 amperes for one square millimeter of the surface of cathode. If, however, the amount of calcium separated will increase, we may lessen the density.

We may prepare the mass to be subjected to electrolysis in any way suitable for manufacturing calcium chlorid containing the said calcium salts. We may, for instance, mix calcium chlorid with calcium fluorid, preferably both substances previously pulverized, or we may effect the melting of calcium chlorid and bring calcium fluorid into the mass.

The proportions of the calcium salts to be added to the calcium chlorid may vary according to the depression of the melting-point of the calcium chlorid required. The skilled workman will find the proportions by experiments. We have found a proportion of about twenty per cent. calcium fluorid as very suitable.

For illustrating the manner of carrying out our process we shall describe the following example: We place one kilogram calcium chlorid and one hundred and sixty-five grams calcium fluorid into a suitable vessel and effect the melting of the mixture, for instance, by heating with an electric current. The melting-point of the mass will be about at 655° Celsius. The specific gravity of the molten mass will be about 2.5. Now we subject the mass to electrolysis by allowing an electric current to pass through the mass. We use, for instance, as negative pole an electrode of iron the dimensions of which are adapted to the used intensity of electric current, so that the lower part of the electrode may be heated to red heat, but below bright white heat. As positive pole we may use a carbon electrode. We separate the two electrodes by means of a partition of suitable material—for instance, iron, which is immersed into the molten mass. We may use any other suitable material for the electrodes. For instance, we may form the positive pole from nickel. We may use several electrodes instead of one. We may also use several negative electrodes and only one positive electrode. We prefer to use a high density of electric current in order to avoid the formation of subchlorid of calcium during electrolysis.

The proportional active areas of the cathode and anode surfaces may be at the beginning of the process as one to two hundred and may be increased according to the increasing amounts of the calcium separated, so that they will be one to twenty or one to ten.

Although we may use any suitable construction of vessels, we prefer to use such having interiorly a device for heating the mass from the interior by means of electric alternating current or electric continuous current and as may be cooled from the exterior. Muthmame has described such vessels. (See *Liebig's Annalen*, Vol. 320, page 231, especially Plate 1.)

The calcium metal will melt on the cathodes as a globule and may be brought on the surface of the melt, where it may be separated by means of wire ears or in any suitable manner.

By our process we succeed to obtain calcium metal in a coherent state instead of the porous state obtained by the known processes and with a higher yield.

What we claim as our invention, and desire to secure by Letters Patent, is—

1. Process of manufacturing calcium metal consisting in electrolyzing calcium chlorid containing only additions of calcium salts which are capable of depressing the melting-point of calcium chlorid.

2. The process of manufacturing calcium metal consisting in melting calcium chlorid containing only additions of calcium salts which are capable of depressing the melting-point of calcium chlorid and electrolyzing the molten mass.

3. The process of manufacturing calcium metal consisting in melting calcium chlorid containing only additions of calcium salts which are capable of depressing the melting-point of calcium chlorid and electrolyzing the molten mass while maintaining the temperature above the melting-point of calcium metal.

4. The process of manufacturing calcium metal consisting in electrolyzing calcium chlorid containing calcium fluorid.

5. The process of manufacturing calcium metal consisting in electrolyzing calcium chlorid containing calcium fluorid, while maintaining the temperature above the melting-point of calcium metal.

6. The process of manufacturing calcium metal consisting in electrolyzing calcium chlorid containing calcium fluorid and other calcium salts which are capable of depressing the melting-point of calcium chlorid.

7. The process of manufacturing calcium metal consisting in electrolyzing calcium chlorid containing calcium fluorid and other calcium salts which are capable of depressing the melting-point of calcium chlorid while maintaining the temperature above the melting-point of calcium metal.

In witness whereof we have hereunto set our hands in presence of two witnesses.

OTTO RUFF.
WILHELM PLATO.

Witnesses:
  HENRY HASPER,
  WOLDEMAR HAUPT.